April 4, 1967 G. LEVINE 3,312,967
ALTERNATING CURRENT ELECTRICAL LOAD MONITORING DEVICE
Filed May 12, 1964 3 Sheets-Sheet 1
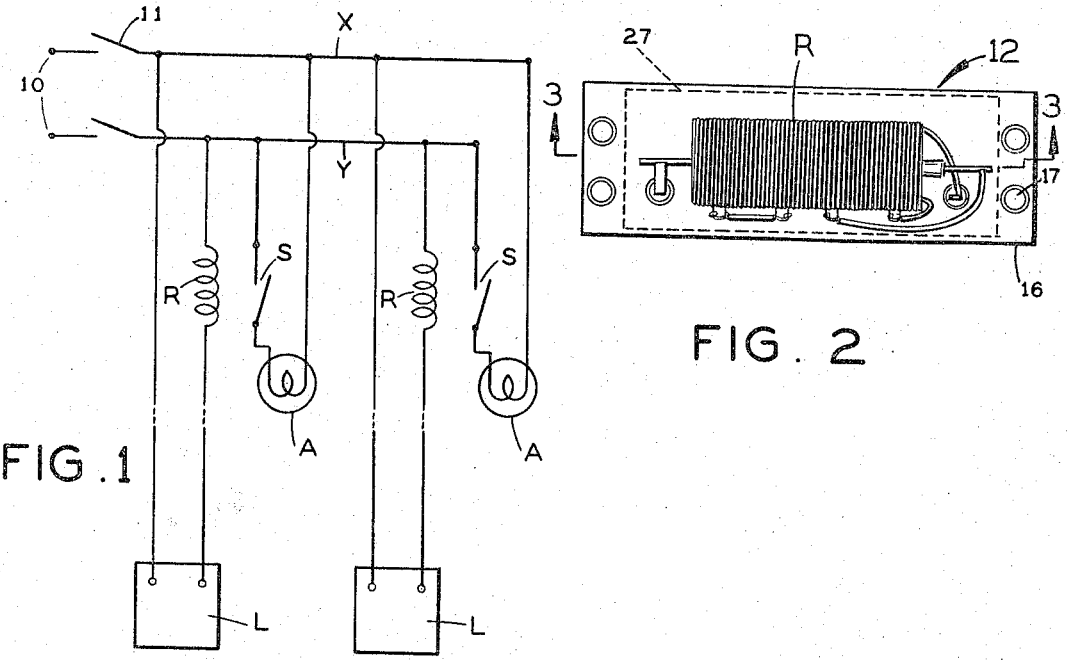
FIG. 1
FIG. 2
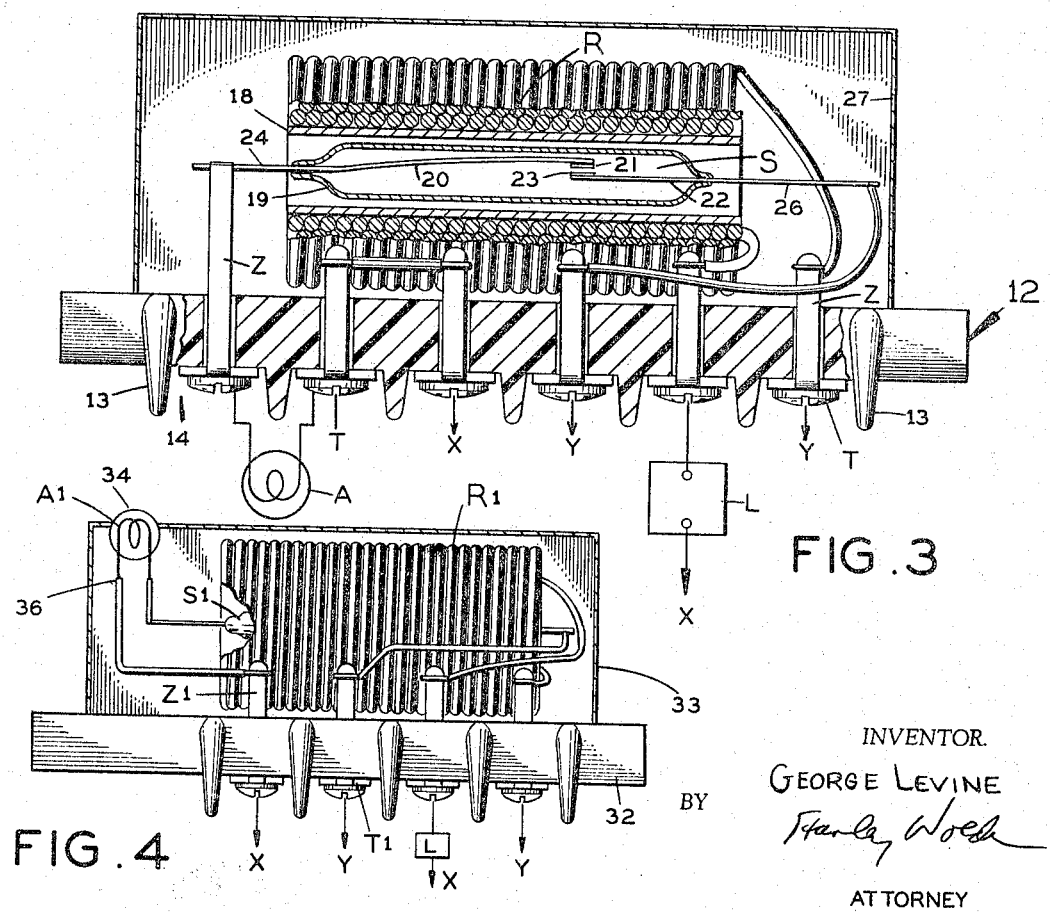
FIG. 3
FIG. 4
INVENTOR.
GEORGE LEVINE
BY
ATTORNEY April 4, 1967 G. LEVINE 3,312,967
ALTERNATING CURRENT ELECTRICAL LOAD MONITORING DEVICE
Filed May 12, 1964 3 Sheets-Sheet 2

INVENTOR.
GEORGE LEVINE
BY Stanley Walder

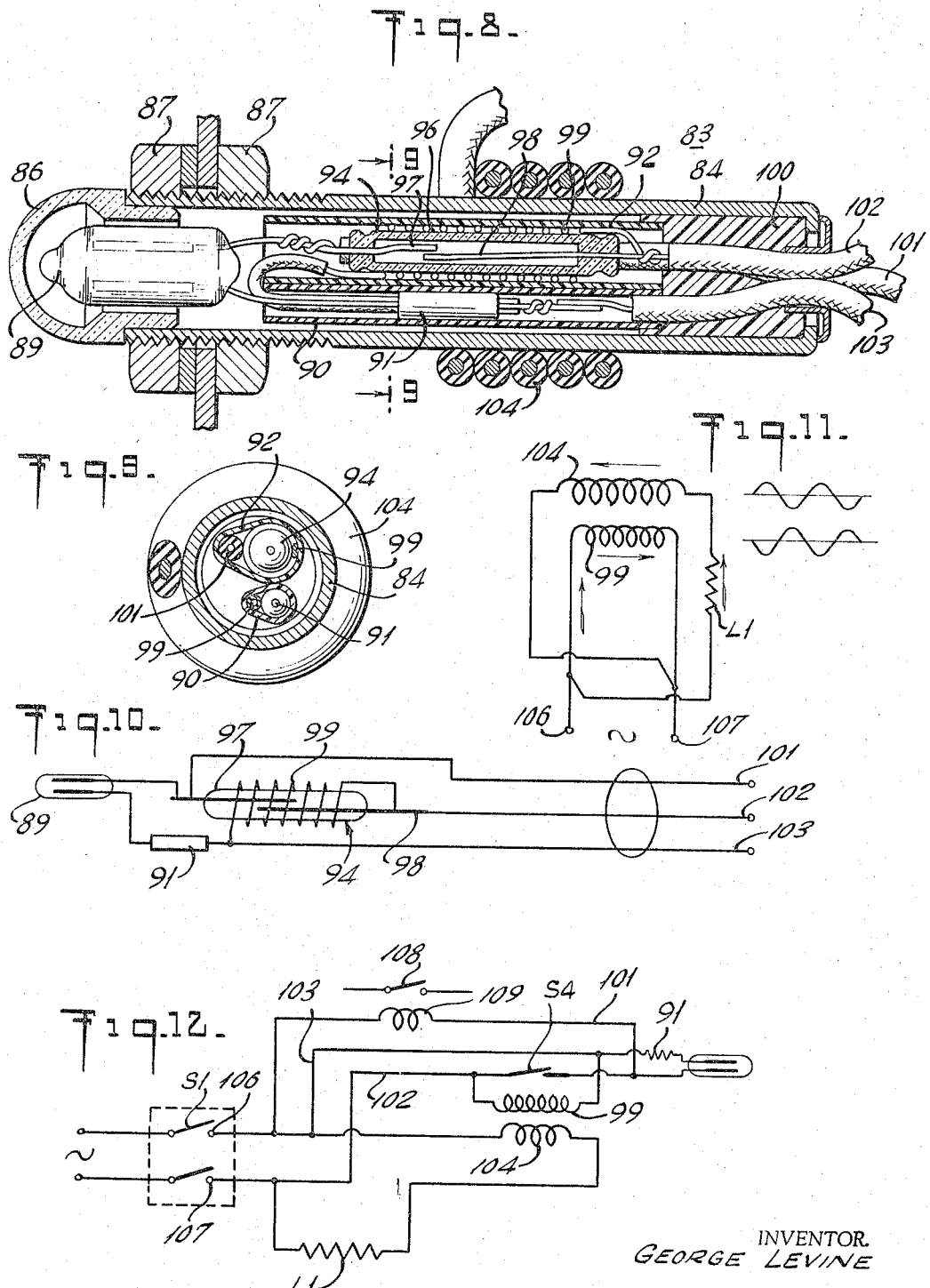

United States Patent Office 3,312,967
Patented Apr. 4, 1967

3,312,967
ALTERNATING CURRENT ELECTRICAL LOAD
MONITORING DEVICE
George Levine, 150—26 76th Road,
Flushing, Queens, N.Y. 11367
Filed May 12, 1964, Ser. No. 369,348
8 Claims. (Cl. 340—253)

The present invention relates generally to improvements in electrical signalling devices and it relates more particularly to an improved electrical network for monitoring either remotely or proximately the operation of one or more electrically energized devices. This application is a continuation-in-part of abandoned patent application Serial No. 252,469, filed January 18, 1963.

In the use of many types of electrical devices such as electric motor driven devices, electrical resistance heaters and other types of electrically energized apparatus it is frequently desirable to provide an indication, preferably visual, remote from the electrical device of the operation thereof. Many systems have been provided and suggested for effecting a remote indication of the operation of an electrical device but these have possessed numerous drawbacks and disadvantages. Typical of the conventional monitoring systems is the use of a pilot light connected to the electric power line through the switch connecting the monitored device to the power line so that closing of the switch energizes the pilot light. This arrangement does not provide a true indication of the operation of the associated electrical device but merely indicates the energization of the lines leading thereto. Thus, the pilot light will be energized even though there is a break in the circuit following the pilot light. Furthermore, if more than one device is connected in parallel through a common switch, this last arrangement cannot be employed with the individual devices. While many systems have been employed which overcome the above disadvantages they have introduced other disadvantages. These latter systems are bulky, expensive, inefficient, unreliable and otherwise leave much to be desired.

It is, therefore, a principal object of the present invention to provide an improved electrical signalling system.

Another object of the present invention is to provide an improved apparatus for remotely or proximately monitoring the operation of an electrically energized device.

Still another object of the present invention is to provide an improved apparatus for affording a visual remote indication of the operation of an electrically energized device.

A further object of the present invention is to provide an improved apparatus for individually monitoring a plurality of electrical devices actuated through a common switch.

Still a further object of the present invention is to provide an improved apparatus of the above nature characterized by its efficiency, compactness, low cost, versatility and reliability.

The above and other objects of the present invention will become apparent from a reading of the following description taken in conjunction with the accompanying drawing wherein:

FIGURE 1 is a circuit diagram of an electrical network embodying the present invention;

FIGURE 2 is a top plan view of a form of control device employed therewith in accordance with the present invention;

FIGURE 3 is a front elevational view thereof, partially in section and illustrating the circuit connections thereto;

FIGURE 4 is a view similar to FIGURE 3 of another form of control and indicator device embodying the present invention;

FIGURE 8 is an enlarged longitudinal sectional view of a further embodiment of the present invention;

FIGURE 9 is a sectional view taken along line 9—9 in FIGURE 8;

FIGURE 10 is a diagrammatic view thereof;

FIGURE 11 is a schematic view illustrating the phase relationship of the bias and control coils thereof; and FIGURE 12 is a circuit network illustrating the application of the subject device.

Figure 5:
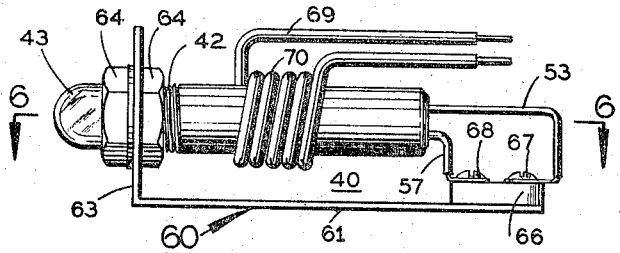
FIGURE 5 is a front elevational view of still another embodiment of the present invention.

In a sense the present invention contemplates the provision of an electrical apparatus comprising an electric load device adapted to consume a predetermined current under normal operating conditions, means including a hollow solenoid connecting said load device to a source of current, a magnetically actuated switch nested in said solenoid, and an electrically energized device connected through said switch to a source of current.

According to one form of the present invention, the solenoid is mounted on a terminal block and enclosed in a housing, the solenoid being connected between a first pair of the terminals. The magnetically responsive switch includes an elongated insulating envelope nested in the solenoid and housing a first resilient arm formed of a magnetic material and carrying a first contact at its free end and a second arm formed of a magnetic material projecting through the other end of the envelope and carrying a second contact confronting and normally spaced from the first contact. The contact pair and hence the switch is closed upon a current passing through the solenoid establishing a magnetic flux sufficient to deflect the resilient arm to the contact closed position. The switch arms are connected to a second pair of terminals. The load is connected through the first pair of terminals to a source of current and an electric indicator lamp is connected through the second pair of terminals to a source of current. According to another form of the present invention the indicating device is carried by the housing and is connected directly through the switch to a pair of terminals on the terminal block.

A highly versatile and adaptable device is provided by a modified form of the present invention in which the magnetically responsive switch is housed in a non-magnetic casing which carries a signal lamp having a terminal connected in series with the switch and another terminal permitting its connection to a source of current. The cable carrying the load line is merely wound as a control coil around the non-magnetic casing, the number of turns depending on the rated load current, being inversely proportional thereto. A plurality of the above devices may be mounted on a common panel, each being wound with a corresponding load line. In order to better adapt the present device for use with an alternating current load, a high resistance network including a high turn biasing coil encircles the magnetically responsive switch and is connected in a phase opposite to the control coil to the source of current.

Referring now to the drawing and more particularly to FIGURES 1 and 3 thereof which illustrate a preferred embodiment of the present invention, the reference numeral 10 generally designates the terminals of a source of current, such as the 110 volt or 220-volt conventional power line which are connected by way of a main switch 11 to a pair of current carrying lines X and Y. There are provided one or more load defining electrically energized devices L which are to be powered from the terminals 10 and whose operations are to be remotely monitored. The devices L may be any type of current consuming device such as an electric motor, for example those employed in driving refrigeration units, appliances or the like, resistance heating units or other electrical devices. Each of the load devices L is connected in series with a respective hollow solenoid R across the lines XY, the solenoid R being located where desired and convenient either proximate to or remote from the corresponding load device L.

Nesting in each of the solenoids R is a magnetically responsive normally open switch S which is actuated by a minimum predetermined axial magnetic flux produced by the solenoid R which in turn depends on the number of solenoid turns and the current flowing therethrough. An electrically energized indicator device, such as a lamp A is connected in series with each of the switches S across the lines XY. The indicator device A may be of any suitable type, preferably providing a visual indication, and may be located either remote from or proximate to the switch S as desired.

The solenoid switch assembly RS is advantageously constructed as illustrated in FIGURES 2 and 3 of the drawing and include a base defining flat rectangular terminal block 12 formed of an insulating material and subdivided at its bottom face by regularly longitudinally spaced transversely extending depending ribs 13 into transverse channels 14 and wing sections 16 provided with mounting apertures 17. Located in each of the channels 14 is a screw terminal T, six successive terminals T being provided in the present embodiment. Each screw terminal T engages a tapped bore formed in a corresponding bar located in a respective channel 14, the bar being provided with a connector lug Z projecting upwardly therefrom through and above the base 12.

The solenoid R extends longitudinally of and is suitably mounted to the base 12 and includes one or more tightly wound superimposed helical series connected wire coils encircling a tubular axial core member 18 formed of an insulating material. The solenoid R terminates in a pair of leads which are connected to respective lugs Z of the right end pair as viewed in FIGURES 2 and 3.

The switch S is nested in the tubular core 18 and includes an hermetically sealed elongated envelope 19 formed of glass or other suitable insulating material. Anchored to one end of the envelope 19 is a switch arm defining member 20, formed of a resilient electrically conducting ferromagnetic material. The switch arm 20 is elongated and inclined to the longitudinal axis of the envelope 19 and preferably carries at its free end an inwardly directed very shallow contact element 21. A second arm 22 formed of an electrically conducting ferromagnetic material is anchored to the opposite end of the envelope 19 and carries at its free end a second shallow contact element 23 confronting and normally spaced from the first contact element 21. The arms 20 and 22 are connected to suitable leads 24 and 26 projecting through corresponding ends of the envelope 19 and connected respectively to the leftmost lug Z and to the righthand lug Z of the intermediate pair thereof. The lug Z next adjacent to the leftmost lug is connected to the next adjacent lug to the right thereof. The assembly of the switch S solenoid R and lugs Z are advantageously enclosed in a housing 27 suitably attached to the base 12 leaving the wings 16 free. In the alternative, the unit may be potted or encapsulated in any conventional manner, leaving the screw terminals T accessible.

In connecting the unit into operating circuit the indicator A is connected across the lefthand pair of terminals T and the intermediate pair of terminals T are connected to the lines X and Y. One of the righthand pair of terminal T is connected directly to one of the lines XY and other terminal T of the pair is connected to the other of lines XY through a respective load device L.

Considering the operation of the improved apparatus, upon closing of the switch 11 the lines XY are energized to energize the load devices L through corresponding solenoids R. If the respective load device L is drawing a sufficient amount of current, which should not be substantially less than that consumed under normal operating conditions, the magnetic flux produced by the solenoid R is sufficient to deflect the arm 20 and close the contacts 21 and 23 and hence the switch S. The closing of switch S completes the circuit of the lamp A to the lines XY and energizes the lamp A to indicate the operation of the load device L. In the event that the current drawn by the load device L falls appreciably below normal due to some defect or break in the circuit, the current through the solenoid R drops and the magnetic flux is insufficient to keep the switch S closed. The opening of the switch de-energizes the lamp A furnishing an indication of a defect.

The magnetic sensitivity of the switch S and the number of turns in the solenoid R should be so related that the magnetic flux produced by the solenoid R by a current flowing therethrough corresponding to the current consumption of the load device L under normal operating conditions is sufficient to actuate the switch S. On the other hand a current through the solenoid R which would correspond to or be less than a current through the load L which would indicate a defective circuit should be insufficient to actuate the switch S. The resistance of the solenoid is determined by two factors: first, it should be low enough so that the voltage drop across it is so small that it represents no substantial burden in proportion to the load; and second, it is desirable that the resistance of the solenoid be determined so that sufficient current will pass therethrough to develop the required ampere turns, in a minimum number of turns, to pull-in switch S. In addition the solenoid R advantageously contains between 19 and 350 turns arranged in a number of layers depending on current required, affording maximum compactness.

An example of a solenoid which is highly suitable in the present system for a load rating of 300 to 2500 watts at 110 volts or 600 to 5000 watts at 220 volts is a two layer solenoid wound of No. 12 gauge copper wire and having 20 turns in the inner layer and 19 turns in the outer layer. The switch S associated therewith requires for actuation a minimum magnetic flux of about 100 ampere turns corresponding to a current of about 2.5 amperes. For use with a lower wattage load device L, that is one having a rating at 110 volts of 50 to 400 watts or at 220 volts of 100 to 800 watts, and having a magnetically responsive switch S actuated by a minimum magnetic flux of about 87 ampere turns, a solenoid of seven layers with 43 turns per layer of No. 20 gauge copper wire is highly suitable.

In FIGURE 4 of the drawing there is illustrated another embodiment of the present invention differing from that above described only in that the indicator lamp is mounted directly on the solenoid switch unit and in the associated internal wiring. Specifically, the solenoid $R_1$ is mounted on a base defining terminal strip 32 having two pairs of screw terminals $T_1$ and associated lugs $Z_1$, and has nested therein a magnetically responsive switch $S_1$ as earlier described. Secured to the base 32 in any suitable fashion is a housing 33 which encloses the lugs 21 and the solenoid and switch assembly $R_1S_1$. Mounted on a wall of the housing 33 and registering with an opening therein is a pilot light assembly $A_1$ of conventional structure which houses an electric lamp and is provided with an outwardly directed window 34 and inwardly disposed terminals 36. One of the pilot light terminals 36 is connected to one of the lefthand pair of screw terminals $T_1$ and the other terminal 36 is connected in series with the switch $S_1$ to the other of said pair of screw terminals $T_1$. The leads of the solenoid $R_1$ are connected to opposite of the righthand pair of terminals $T_1$.

In connecting the last described device into circuit, the lefthand pair of terminals $T_1$ is connected to the lines XY whereas the righthand pair of terminals $T_1$ is connected to the lines XY in series with the load L. The operation of the last described device is similar to that first described.

Figure 6:
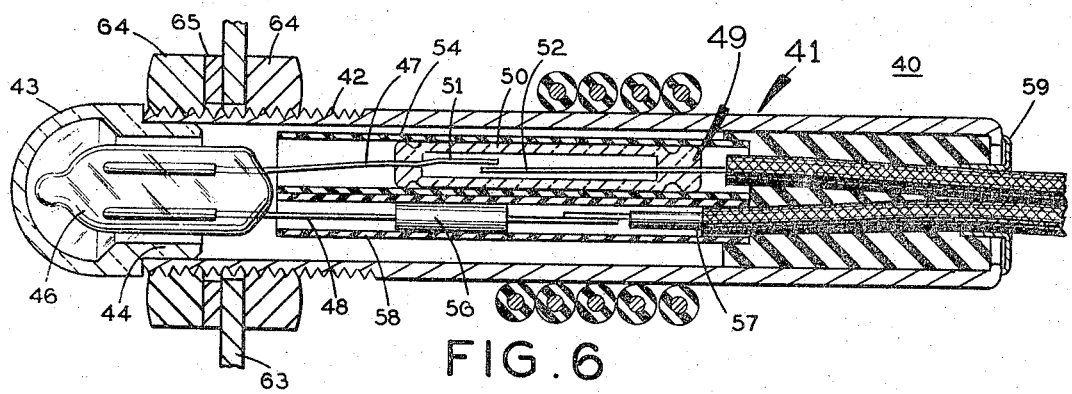
FIGURE 6 is an enlarged sectional view taken along line 6—6 in FIGURE 5.

Referring now to FIGURES 5 and 6 of the drawings which illustrate another embodiment of the present invention of great simplicity and versatility, and easily adapted to many uses, the reference numeral 40 designates the improved device which includes a non-magnetic casing shown as a tubular member 41 formed of brass or other non-magnetic material and having an externally threaded leading end section 42. A dome shaped hollow cap 43 formed of a light transparent or translucent, preferably synthetic organic plastic material is provided with a rearwardly directed peripheral lip 44 which snugly engages the leading inner section of the tubular member 41 and which has a peripheral shoulder abutting the tubular member end face.

Located in the cap 43 is a signal lamp 46, advantageously of the gas discharge type such as a neon bulb, the lamp 46 having a pair of rearwardly extending wire leads 47 and 48 respectively. The lead 47 is conected to one terminal of magnetic reed switch 49 of the construction described above. Specifically the reed switch 49 includes a thin tubular envelope 50 of an insulating material, for example glass, hermetically closed at both ends and preferably containing an inert atmosphere. Housed in the envelope 50 are a longitudinally extending short reed 51 of a resilient magnetic material and a longitudinally extending long reed 52 likewise of a resilient magnetic material, the outer ends of the reeds 51 and 52 being firmly embedded in and projecting through the closed ends of the envelope 50. The inner ends of the reeds are in overlapping normally closely spaced relationship so that there is no electrical contact between them. However, upon the establishment of a longitudinal magnetic field exceeding a predetermined minimum intensity along the lengths of the reeds 51 and 52, they are magnetically attracted to effect the engagement between the overlapping ends of the reeds and the closing of the switch 49 as long as the magnetic field of the aforesaid intensity persists, the switch opening upon the discontinuance of the magnetic field.

The other terminal of the magnetic reed switch 49 is connected to an insulator covered wire conductor 53 which extends through the trailing opening in the tubular member 41. A tubular braided insulator sleeve 54 engages and encloses the switch lead and at least the uncovered section of the wire 53. The lamp lead 48 is connected through a current limiting resistor 56 to an insulator covered wire conductor 57 which projects through the trailing opening of the tubular member 41. The lamp lead 41, resistor 50 and the uncovered section of the wire 57 are enclosed in a braided insulator sleeve 58. A grommet 59 registers with the trailing opening in the tubular member 41 and encircles the emerging conductors 53 and 57. The space within the tubular member 41 surrounding the conductors 53 and 57 and the sleeves 54 and 58 are advantageously filled with any suitable thermoplastic or plotting material, such as many of the polymeric organic resins or the like, thereby to effect a firm stable assembly.

The sensing device 40 is supported by a mounting bracket 60 including a horizontal arm 61 and a vertical leg 63 directed upwardly from the leading edge of the arm 61 and having a circular opening formed therein. The tubing leading section 42 registers with the opening in the leg 63, with the cap 43 being outwardly directed and is secured thereto by a pair of nuts 64 engaging the threaded section 42, one of the nuts bearing on the rear face of the leg 63 and the other nut 64 bearing on the front face of the leg 63 through an intervening washer 65. Mounted on the rear upper face of the bracket arm 61 is a block 66 provided with a pair of terminals 67 and 68 which are connected to the conductors 53 and 57 respectively. An insulator covered conductor 69 which connects the monitored load to its source of energizing current is wound a predetermined number of turns about the tubular member 41 in the area of the switch 49 to form an actuating solenoid.

The operation of the sensing and signalling device 40 is similar to those earlier described, the terminals 67 and 68 being connected to a source of current and the solenoid 70 being connected in series with the current to the monitored device or load as aforesaid When the device is drawing its rated current, the magnetic field produced by the solenoid 70 is sufficient to close the switch 49 and hence complete the circuit to the lamp 46 and energize the same. It should be noted that a device approximately the dimensions of that illustrated in FIGURE 5 of the drawings is actuated at about 20 ampere turns or more and that at 230 volts a solenoid 70 of only one turn is required for a 5000 watt load, and solenoids with correspondingly more turns are recommended for respectively smaller loads at this voltage, for example, 6 turns at 1500 watts, 12 turns at 900 watts and 17 turns at 600 watts For the same number of solenoid turns and at 115 volts the actuating load wattage is half that given above. The gauge of the conductor 69 should be that suitable for carrying the rated load with which the device 40 is associated.

Figure 7:
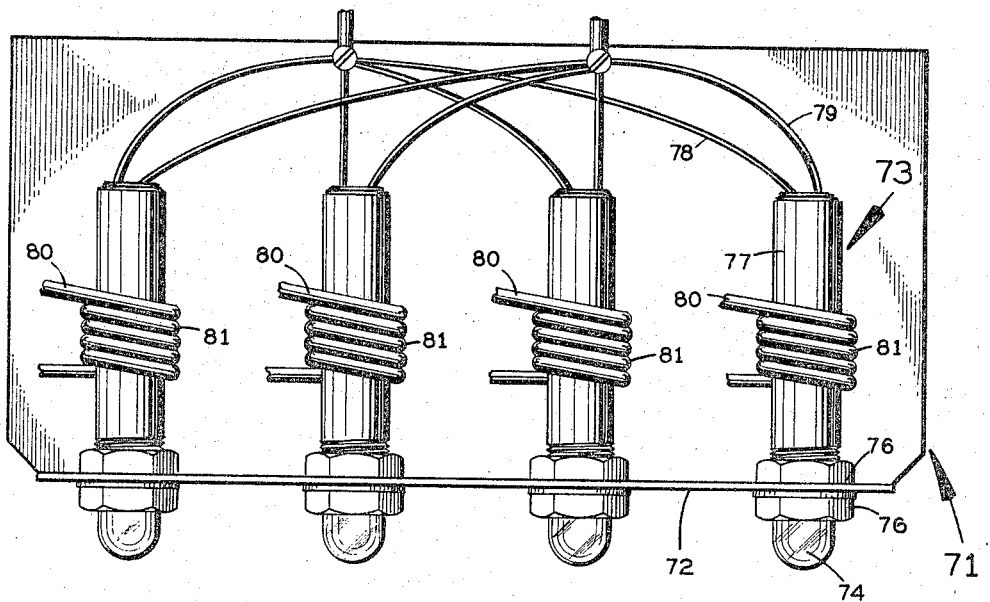
FIGURE 7 is a top plan view of a further embodiment of the present invention.

In FIGURE 7 of the drawing there is illustrated a multiple indicating device of the above nature. Specifically, there is provided a bracket 71 having a vertical front panel on which are mounted a plurality of horizontally spaced signalling devices similar in construction to the device 40 described above and having forwardly directed light transmitting caps 74. Each of the signalling devices 73 is secured to the panel 72 by means of nuts 76 carried by the threaded section of the tubular housing 77 and is provided with a pair of leads 78 and 79 connected through a resistor and a magnetic reed switch to a signal lamp located in the housing 77, as in the device 40. The leads 78 of each of the devices 73 are interconnected and the leads 79 are interconnected, and these in turn are connected to respective oppoiste terminals of a source of current. A conductor 80 which feeds current to a respective electrically energized device or load is wound into a solenoid 81 around each of the housings 77, the number of turns being inversely proportional to the rated currents of the corresponding monitored devices.

The operation of the devices 73 are similar to that of the device 40. It should be noted that a series of two or more solenoids 81 of different numbers of turns may be wound about successive housings 73 from a common conductor 80 so that an indication is available of the level of the current consumed by the monitored load over a predetermined range.

While the operation of the device 40, described above, is highly satisfactory it possesses certain drawbacks when employed in an alternating current network. Since, under normal operating conditions the read switch is in a closed condition, where the solenoid 70 is energized by an alternating current the reed arms vibrate at twice the alternating current frequency to impart a corresponding chatter to the switch contacts thereby seriously limiting the useful life thereof.

In FIGURES 8 to 12 of the drawings there is illustrated another embodiment of the present invention which may be employed to great advantage in alternating current networks and in which under normal operating conditions contact chatter is obviated.

The modified device 83 differs from the device 40 earlier described primarily in the provision of a switch biasing coil connected in opposite phase to the control coil. Specifically, the device 83 includes a non-magnetic tubular casing 84 having an externally threaded end, a light transmitting cap 86, mounting nuts 87 engaging the casing threaded end and a neon bulb 89 housed in the end of the casing 84 and corresponding to and related in the manner of the respective components 41, 43, 64 and 46 of the device 40.

A first longitudinally extending insulating sleeve 90 is housed in the casing 84 and has a current limiting resistor 91 disposed therein. Also housed in the casing 84 is a second insulator sleeve 92 offset relative to and substantially coextensive with the first sleeve 90. A magnetically responsive normally open reed switch 94 extends longitudinally within the sleeve 92 and is similar to the switch 49, including a hermetically sealed inert atmosphere containing tubular glass envelope 96 supporting therein from opposite ends thereof overlapping closely separated short and long resilient reeds 97 and 98 respectively, formed of magnetic material. Located in the second sleeve 92 and encircling and extending along the length of the switch envelope 96 is a biasing coil or solenoid 99 of a large number of turns. Although the coil 99 is shown, for convenience of illustration, as containing only a few turns, it advantageously is multilayered and contains at least a few hundred turns.

Entering the casing 84 through an insulator plug 100 in the end thereof are three insulation covered leads or conductors 101, 102 and 103 respectively. The biasing coil 99 is connected between the leads 102 and 103 and is advantageously formed of a wire having a relatively high resistance to limit the current therethrough to a low value to minimize the energy dissipation thereof preferably to below 1½ watts and the heating of the device 83. In the alternative, the biasing coil 99 may be connected through a current limiting resistor between the leads 102 and 103. The switch arm 97 is connected to the lead 101 and to one terminal of the neon bulb 89, the other terminal of which is connected through the resistor 91 to the lead 103. The switch arm 98 is connected to the lead 102.

In the operation of the device 83 in the monitoring of a load L1 energized by a source of alternating current, a control coil 104 of a small number of turns an of heavy low resistance wire encircles the casing 84 in registry with the switch 94. The load L1 is connected through the control coil 104 between terminals 106 and 107 which are connected by way of a power switch S1 to opposite poles of a source of alternating current. Also connected between the terminals 106 and 107 through the leads 102 and 103 is the biasing coil 99. It is important to note, as seen in FIGURE 11 of the drawings, that the biasing coil 99 and the control coil 104 are connected to their energizing current sources in opposite phase, that is in a manner in which the magnetic fields produced thereby are in bucking opposition. If the coils 99 and 104 are wound in the same direction their corresponding leading and trailing terminals are connected to opposite terminals 106 and 107 and if the coils 99 and 104 are oppositely wound their corresponding terminals are connected to the same terminals 106 and 107.

The number of turns in the coils 99 and 104 and the current passing therethrough under normal operating conditions are such that difference between the magnetic ampere turns produced by the coils which are in bucking relationship is of a value not sufficient to magnetically close the switch 94 which thus remain open and the bulb 89 deenergized. However, in the event that the load L1 should burn out or otherwise open, the coil 104 is deenergized and the magnetic field produced by the biasing coil 99 is sufficient to and closes the switch 94 to energize the bulb 99 and provide a visual indication of a failure. It should also be noted that should the impedance of the load L1 drop sufficiently so that the current therethrough rises correspondingly, the magnetic field produced by the control coil 104 will effect the closing of the switch 94 in spite of the opposite biasing field produced by the coil 99. As in the previously described embodiment, the device 83 may be employed with differently rated loads by adjusting the number of turns in the coil 104.

Since under normal operating conditions the switch 94 is open and the bulb 89 deenergized, the life expectancy of the device 83 is substantially unlimited. The switch 94 closes and chatters only during the usually infrequent malfunctioning of the monitored network and as such is permitted to continue for only a very short interval. While the device is illustrated as employed with an alternating current it may be used equally as well with direct current. Furthermore, the actuation of the switch 94 may be employed to control other devices in place of or in addition to the bulb 89. For example, the solenoid 109 of a relay 108 may be connected between the leads 101 and 103 so that upon the magnetic closing of the switch 94 the solenoid 109 is connected between the terminals 106 and 107 and thereby energized to activate the relay 108 and any device controlled thereby, for example, an audible signal generator or an apparatus circuit breaker.

As an example of a biasing coil 99 which may be employed with a glass enveloped reed switch 94 having a closing alternately magnetic field of 25 ampere turns and an opening field of 18 ampere turns is one of 4600 turns of enamaled 0.00275 wire having an overall resistance of 37,900 ohms. The length of the coil is 1⅝ inches with an inside diameter of ¼ inch. The current through the coil at 220 volts is about 5.8 milliamperes and the energy dissipation is about 1.26 watts. Since the ampere turns produced by the above biasing coil is about 27 ampere turns the magnetic ampere turns produced by the control coil during normal operating conditions should be between about 3 ampere turns and 40 ampere turns. The number of turns in the control coil will depend on the normal current consumption of the monitored load. It should be noted however, that the biasing coil may produce a magnetic field only very little more than that required to close the switch 94 so that a very sensitive sensing device is produced which may require a control coil, in many cases, of only one turn.

While there have been described and illustrated preferred embodiments of the present invention it is apparent that numerous alterations, omissions and additions may be made without departing from the spirit thereof.

What is claimed is:

1. An electric load monitoring device comprising a longitudinally extending casing of non-magnetic material, a magnetically actuated switch housed in said casing, a biasing coil housed in said casing and encircling said switch, means for connecting said biasing coil to a source of biasing alternating current, a control coil encircling said casing, and means for connecting said control coil in opposite phase to said biasing coil through a monitored load to a source of alternating current, said alternating current energized biasing coil being capable of magnetically closing said switch and said alternating current energized control coil under normal monitored load current conditions bucking said biasing to open said switch.

2. The electric responsive device of claim 1 wherein said switch comprises a longitudinally extending reed element of magnetic material enclosed in an insulating envelope.

3. An electric network comprising a current consuming loads, a source of alternating current, a normally open magnetically responsive switch, a biasing coil magnetically coupled to said switch and connected to said source of alternating current to produce a magnetic field sufficient to bias said switch to a closed position, and a control coil magnetically coupled to said switch and connected in opposite phase to said alternating current source through said load and normally producing a magnetic field sufficient to buck said biasing coil magnet field and effect the opening of said switch.

4. The electric network of claim 3 including an electrically responsive signalling device connected in series with said switch to a source of current.

5. The electric network of claim 3 including an electric relay having a solenoid connected in series with said switch.

6. The electric network of claim 4 including a common housing supporting said coils, switch and signalling device.

7. The electric network of claim 3 wherein said biasing coil has a relatively large number of turns and said control coil a relatively small number of turns.

8. The electric network of claim 3 wherein said biasing coil is of relatively high resistance and said control coil is of relatively low resistance.

References Cited by the Examiner

UNITED STATES PATENTS

| 1,574,513 | 2/1926 | Ratliff et al. | 340—252 |
| 2,588,314 | 3/1952 | Wicks | 340—252 X |
| 3,031,655 | 4/1962 | Temple et al. | 340—381 X |
| 3,124,670 | 3/1964 | Rose | 200—87 |
| 3,182,226 | 5/1965 | Peek | 317—155.5 X |
| 3,210,614 | 10/1965 | Welk | 317—155.5 X |
| 3,242,411 | 3/1966 | Lilienfield | 317—155.5 X |
| 3,256,425 | 6/1966 | Deeg | 317—155.5 X |

FOREIGN PATENTS 735,401   5/1943   Germany.

NEIL C. READ, *Primary Examiner.*

D. K. MYER, *Assistant Examiner.*